(12) United States Patent
Berry et al.

(10) Patent No.: US 8,017,712 B2
(45) Date of Patent: Sep. 13, 2011

(54) PROCESS FOR THE PREPARATION OF SOLID SOLVENTLESS MQ RESINS

(75) Inventors: Vicki Lynn Berry, Midland, MI (US); Leon Neal Cook, Midland, MI (US); Tina Marie Leaym, Saginaw, MI (US); Randall Gene Schmidt, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 116 days.

(21) Appl. No.: 12/303,459

(22) PCT Filed: May 16, 2007

(86) PCT No.: PCT/US2007/011852
§ 371 (c)(1),
(2), (4) Date: Dec. 4, 2008

(87) PCT Pub. No.: WO2007/145765
PCT Pub. Date: Dec. 21, 2007

(65) Prior Publication Data
US 2009/0259011 A1    Oct. 15, 2009

Related U.S. Application Data

(60) Provisional application No. 60/812,488, filed on Jun. 9, 2006.

(51) Int. Cl.
| C08G 77/04 | (2006.01) |
| B28B 3/20 | (2006.01) |
| B28B 3/22 | (2006.01) |
| B29C 47/00 | (2006.01) |

(52) U.S. Cl. ..... 528/10; 528/25; 264/176.1; 264/211.21
(58) Field of Classification Search ..... 528/25
See application file for complete search history.

(56) References Cited

U.S. PATENT DOCUMENTS

| 2,676,182 A | 4/1954 | Daudt et al. |
| 2,857,356 A | 10/1958 | Goodwin |
| 4,446,090 A * | 5/1984 | Lovgren et al. ............. 264/211 |
| 4,935,484 A | 6/1990 | Wolfgruber et al. |
| 5,302,685 A * | 4/1994 | Tsumura et al. ............. 528/33 |
| 5,324,806 A | 6/1994 | Wengrovius et al. |
| 5,612,400 A | 3/1997 | Gross et al. |
| 5,618,902 A | 4/1997 | Wengrovius et al. |
| 5,708,098 A | 1/1998 | Cook et al. |
| 5,723,521 A | 3/1998 | Cook et al. |
| 5,741,876 A | 4/1998 | Carpenter, II et al. |
| 5,786,413 A * | 7/1998 | Weidner et al. ............. 524/268 |
| 5,817,729 A | 10/1998 | Wengrovius et al. |
| 5,837,784 A | 11/1998 | Vincent |
| 5,837,793 A | 11/1998 | Harashima et al. |
| 5,861,450 A | 1/1999 | Chen et al. |
| 5,962,568 A | 10/1999 | Decker et al. |
| 6,013,217 A | 1/2000 | Hauenstein et al. |
| 6,034,178 A | 3/2000 | Decker et al. |
| 6,107,380 A | 8/2000 | Evans |
| 6,288,144 B1 | 9/2001 | Roberts et al. |
| 6,362,262 B1 | 3/2002 | Evans |
| 6,384,119 B1 | 5/2002 | Tye et al. |
| 6,423,760 B1 | 7/2002 | Qiao et al. |
| 6,465,576 B1 | 10/2002 | Grootaert et al. |
| 6,475,500 B2 | 11/2002 | Vatter et al. |
| 6,506,498 B2 | 1/2003 | Decker et al. |
| 6,545,086 B1 | 4/2003 | Kosal |
| 6,552,151 B1 | 4/2003 | Kohler et al. |
| 6,590,032 B2 | 7/2003 | Furukawa et al. |
| 6,679,943 B1 | 1/2004 | Newton et al. |
| 6,703,120 B1 | 3/2004 | Ko et al. |
| 6,727,338 B1 | 4/2004 | Kilgour et al. |
| 6,730,374 B2 | 5/2004 | Gamble et al. |
| 6,730,397 B2 | 5/2004 | Melancon et al. |
| 6,732,494 B1 | 5/2004 | Nolte |
| 6,737,444 B1 | 5/2004 | Liu |
| 6,759,487 B2 | 7/2004 | Gornowicz et al. |
| 6,767,931 B2 | 7/2004 | Martinez et al. |
| 6,774,201 B2 | 8/2004 | Kilgour et al. |
| 6,838,490 B2 | 1/2005 | Zhang et al. |
| 6,887,949 B2 | 5/2005 | Kilgour et al. |
| 6,897,259 B1 | 5/2005 | Cramer et al. |
| 6,932,862 B2 | 8/2005 | Daugherty |

FOREIGN PATENT DOCUMENTS

| EP | 0752443 | 1/1997 |
| EP | 0771581 | 5/1997 |
| EP | 0812870 | 12/1997 |
| EP | 0826719 | 3/1998 |
| EP | 0826738 | 3/1998 |
| EP | 1083195 | 3/2001 |
| EP | 1083205 | 3/2001 |
| EP | 1197674 | 4/2002 |
| WO | WO 03/029381 | 4/2003 |
| WO | WO 03/054064 | 7/2003 |

* cited by examiner

*Primary Examiner* — Robert Loewe
(74) *Attorney, Agent, or Firm* — Patricia M. Scaduto

(57) ABSTRACT

The present invention relates generally to a novel process for making a solid solventless MQ resin comprising the steps of (1)(A) feeding at least one MQ resin dispersed in a volatile solvent into an extrusion device, (2) removing the volatile solvent to form a solid solventless MQ resin; and (3) recovering the solid solventless MQ resin, provided steps (1) to (3) are completed without the addition of a linear silicone fluid.

19 Claims, No Drawings

PROCESS FOR THE PREPARATION OF SOLID SOLVENTLESS MQ RESINS

CROSS-REFERENCE TO RELATED APPLICATIONS

This application is a U.S. national stage filing under 35 U.S.C. §371 of PCT Application No. PCT/US07/011852, filed May 16, 2007, currently pending, which claims the benefit of U.S. Provisional Patent Application No. 60/812,488, filed June 9, 2006 under 35 U.S.C. §119 (e). PCT Application No. PCT/US07/011852 and U.S. Provisional Patent Application No. 60/812,488 are hereby incorporated by reference.

BACKGROUND OF THE INVENTION

The present invention relates generally to a novel process for making solid solventless MQ resins having high bulk density comprising the steps of (1)(A) feeding at least one MQ resin dispersed in a volatile solvent into an extrusion device, (2) removing the volatile solvent to form a solid solventless MQ resin; and (3) recovering the solid solventless MQ resin, provided steps (1) to (3) are completed without the addition of a linear silicone fluid.

As used herein, the term "resin" describes a silicone composition wherein the molecular structure is arranged in a predominantly three dimensional network. Thus, the term silicone "resin" is used to distinguish the composition from linear silicone fluids.

The silicone resins described in the present invention are frequently designated "MQ" resins. MQ resins are macromolecular polymers comprised primarily of $R_3SiO_{1/2}$ and $SiO_{4/2}$ units (the M and Q units, respectively) wherein R is a functional or nonfunctional, substituted or unsubstituted monovalent radical. Those skilled in the art will appreciate that such resins may also include a limited number of $R_2SiO_{2/2}$ and $RSiO_{3/2}$ units, respectively referred to as D and T units. As used herein, the term "MQ resin" means that, on average, no more than about 20 mole percent of the resin molecules are comprised of D and T units.

Processes for making solid solventless MQ resins are known. Since MQ resins with M to Q ratios of less than 1 are typically solids at room temperature and very high viscosity materials in the molten state at elevated temperatures, a viable process must be able to handle this solid material. Therefore, the removal of the solvent from solid MQ resins in a process such as a wiped film evaporator which relies on temperature and gravity to move the material through the process as solvent is removed is not viable. Spray drying the solid MQ resin to remove solvent is a viable process (see for example U.S. Pat. No. 4,935,484, U.S. Pat. No. 5,324,806, U.S. Pat. No. 5,741,876), however, this method produces solid solventless MQ resins as a low density powder which are difficult to handle and costly to transport. Further, these MQ resins with low (less than 0.9) M to Q ratios that are best suited for spray drying into powders do not exhibit thermoplastic behavior and hence are difficult to disperse when formulating blends with other products, such as organic thermoplastics and silicone rubbers.

The inventors have found that a twin screw extruder has the torque requirements necessary to push these MQ resins having M to Q ratios less than one through the process as solvent is removed. Since a dense molten rod or sheet, or a crumbly mass exits the end of the extruder rather than a low density powder as in spray drying, the handling of the solid resin is facilitated. Simpler and less expensive materials handling, minimization of explosion hazards from dust clouds and smaller volume storage vessels are all benefits of producing high density solid resin materials rather than low density solid resin powders.

Previously, solventless silicone compositions have been prepared in an extruder by blending a MQ resin and a linear silicone fluid and then removing the solvent (U.S. Pat. No. 5,708,098). However, while these materials may have higher bulk density then powders, their utility in formulations are limited because of the presence of the linear silicone fluid which can cause migration issues in downstream formulating of release coatings, plastics additives or processing aids. Therefore, it would be highly desirable to provide a process of preparing solid solventless MQ resins where the solid solventless MQ resins have a high bulk density and are not mixed with linear silicone fluids.

The inventors have unexpectedly found that solid solventless MQ resins may be prepared without linear silicone fluid using an extrusion device by utilizing MQ silicone resins having a certain M to Q ratio. Further, the inventors have determined that cofeeding a propyl silsesquioxane ($T^{Pr}$) resin with the MQ resin facilitates the processing of MQ resins with low (less than 0.9) M to Q ratios.

BRIEF SUMMARY OF THE INVENTION

The present invention is a process for producing a solid solventless MQ resin comprising the steps of (1)(A) feeding at least one MQ resin dispersed in a volatile solvent into an extrusion device, where each MQ resin has the general formula (I) $R^1{}_n(R^2O)_bSiO_{(4-n-b/2)}$ where each $R^1$ is monovalent and independently selected from hydrogen, alkyl, alkenyl, oximo, aryl, carbinol, anhydride, epoxy, carboxyl, ether, polyether, amide, and alkyl amino groups, which $R^1$ groups may be the same or different, with the proviso that at least sixty mole percent of $R^1$ groups are methyl, $R^2$ is hydrogen or a monovalent C1 to C4 alkyl group, on average n is from 1.1 to 1.6, and b is such that group ($R^2O$) is 1 to 10 weight percent of the MQ resin, said MQ resins having a number average molecular weight (Mn) between 1,500 and 7,000;

(2) removing the volatile solvent to form a solid solventless MQ resin; and (3) recovering the solid solventless MQ resin, provided steps (1) to (3) are completed without the addition of a linear silicone fluid.

An object of the invention is to provide a process for preparing solid solventless MQ resins. Another object of the invention is to provide a process for preparing solid solventless MQ resins where such MQ resins have a high bulk density. Another object of the invention is to provide a process for preparing solid solventless MQ resins where linear silicone fluids are not added to the process.

DETAILED DESCRIPTION OF THE INVENTION

The present invention is a process for producing a solid solventless MQ resin comprising the steps of (1)(A) feeding at least one MQ resin dispersed in a volatile solvent into an extrusion device, where each MQ resin has the general formula (I) $R^1{}_n(R^2O)_bSiO_{(4-n-b/2)}$ where each $R^1$ is monovalent and independently selected from hydrogen, alkyl, alkenyl, oximo, aryl, carbinol, anhydride, epoxy, carboxyl, ether, polyether, amide, and alkyl amino groups, which $R^1$ groups may be the same or different, with the proviso that at least sixty mole percent of $R^1$ groups are methyl, $R^2$ is hydrogen or a monovalent C1 to C4 alkyl group, on average n is from 1.1 to 1.6, and b is such that group ($R^2O$) is 1 to 10 weight percent of the MQ resin, said MQ resins having a number average molecular weight (Mn) between 1,500 and 7,000;

(2) removing the volatile solvent to form a solid solventless MQ resin; and (3) recovering the solid solventless MQ resin, provided steps (1) to (3) are completed without the addition of a linear silicone fluid.

As previously mentioned, the silicone resins employed in the present process are of the MQ-type. Typically, the silicone resin has a general formula (I) $R^1{}_n(R^2O)_b SiO_{(4-n-b/2)}$. Each $R^1$ is monovalent and independently selected from hydrogen, alkyl, alkenyl, oximo, aryl, epoxide, carboxyl, ether, polyether, amide, and alkyl amino groups, which $R^1$ groups may be the same or different, with the proviso that at least sixty mole percent of said $R^1$ groups are methyl. Examples of useful alkyl groups for $R^1$ include C1 to C18 alkyl groups, alternatively C1 to C8 alkyl groups such as methyl, ethyl, propyl, hexyl and octyl. Examples of useful alkenyl groups for $R^1$ include C2 to C18 alkenyl groups, alternatively C2 to C8 alkenyl groups such as vinyl, propyl, hexenyl, octenyl. Examples of useful aryl groups for $R^1$ include C6 to C18 ayl groups, alternatively C6 to C8 aryl groups such as phenyl and benzyl. Alternatively, each $R^1$ is selected from methyl, vinyl, hydrogen, and phenyl. Alternatively, each $R^1$ is methyl.

Either one MQ resin may be used in the present process or various MQ resins may be blended provided on average subscript n in the above general formula (I) is from 1.1 to 1.6. Alternatively, on average n is 1.1 to 1.5. Alternatively, on average n is 1.3 to 1.5.

Subscript b in the above general formula (I) varies such that the group ($R^2O$) is 1 to 10 weight percent of the MQ resin, alternatively 1 to 4 weight percent of the MQ resin. Each $R^2$ is hydrogen or a monovalent C1 to C4 alkyl group. Alternatively, each $R^2$ is hydrogen or a monovalent C1 to C3 alkyl group. Alternatively, each $R^2$ is hydrogen.

The number average molecular weight (Mn) of the MQ resin is between 1,500 and 7,000, alternatively between 2,000 and 5,000. MQ resins suitable for use in process step (1)(A), and methods for their preparation, are known in the art. For example, U.S. Pat. No. 2,814,601 to Currie et al., Nov. 26, 1957, which is hereby incorporated by reference, discloses that MQ resins can be prepared by converting a water-soluble silicate into a silicic acid monomer or silicic acid oligomer using an acid. When adequate polymerization has been achieved, the resin is end-capped with trimethylchlorosilane to yield the MQ resin. Another method for preparing MQ resins is disclosed in U.S. Pat. No. 2,857,356 to Goodwin, Oct. 21, 1958, which is hereby incorporated by reference. Goodwin discloses a method for the preparation of an MQ resin by the cohydrolysis of a mixture of an alkyl silicate and a hydrolyzable trialkylsilane organopolysiloxane with water. MQ resins have also reportedly been prepared by cohydrolysis of the corresponding silanes or by silica hydrosol capping methods known in the art. MQ resins used may also be prepared by the silica hydrosol capping processes of Daudt, et al., U.S. Pat. No. 2,676,182;

The MQ resins used in the present invention are generally dispersed in a volatile solvent. The MQ resins can be dispersed separately in the volatile solvent or generally they are produced using a volatile solvent. Examples of useful solvents include xylene, toluene, hexane, heptane, and silicones having a degree of polymerization (DP) of 10 or less, alternatively, a DP less than 10, alternatively, a DP less than 6. An example of a silicone solvent is 0.65 to 1.5 cSt trimethylsiloxy-terminated dimethylsiloxane.

Since supplying a solid solventless MQ resin enables complete formulating flexibility in products such as coatings, elastomers, cosmetics, hair and skin care products and antifoams it is important to be able to remove the solvent effectively. As used herein, the term "solventless" means that at least 95 weight percent of the solid product is non-volatile when a 1 mm thick layer is exposed to 150° C. for 1 hour; alternatively, at least 98 weight percent (%) of the solid product is non-volatile on the same basis; alternatively, at least 99 weight percent of the solid product is non-volatile on the same basis.

One of the benefits of the present process is that it is not necessary to mix the MQ resin with a linear silicone fluid in order to keep the MQ resin flowable as the solvent is removed. As used herein, the term "linear silicone fluid" describes a non-volatile linear silicone polymer, where non-volatile includes only silicone polymers having a DP greater than 10. An example of a linear silicone fluid excluded from use in the present method is a polydimethylsiloxane having a DP greater than 10. The term "fluid" is used in this sense even if the linear silicone polymer contains a minor amount of branched chains or if, at room temperature, the material appears as more of a gum or solid. In other words, the term "fluid" describes only the predominantly linear characteristics of the polymer. It will be understood that linear silicone fluids may also include reactive or functional groups. Linear silicone fluids, then, can be defined as having a general formula (II): $(R'_3SiO_{1/2})_x (R'_2 SiO_{2/2})_y (R'SiO_{3/2})_z$ where x and y are positive numerical values and z is 0 or a positive numerical value with the provisos that x+y+z=1, y/(x+y+z)≧0.8 and R' is a functional or nonfunctional, substituted or unsubstituted organic radical, and the DP is greater than 10.

The inventors have determined that certain nonlinear materials aid in the processing of the MQ resin. Therefore, optional step (1)(B) in the present process, involves co-feeding into the extrusion device along with the MQ resin up to 50 weight percent resin solids of at least one silsesquioxane resin (T based resin) having a general formula (III) $R^3{}_{n'}(R^2O)_{b'}SiO_{(4-n'-b'/2)}$, based on total resin solids where $R^3$ is a monovalent C1 to C8 hydrocarbon group, on average n' is from 0.8 to 1.2, b' is such that group ($R^2O$) is 1 to 20 weight percent of the T based resin, alternatively 1 to 10 weight percent on the same basis, $R^2$ is as described above; and the Mn of the T based resin is between 1500 and 10,000. Alternatively, from 0.1 to 50 weight percent based on total resin solids of the T based resin may be added to the process. Alternatively, from 5 to 30 weight percent based on total resin solids of the T based resin may be added to the process, alternatively 5 to 15 weight percent on the same basis. The $R^3$ group is a monovalent C1 to C8 hydrocarbon group. Examples of the $R^3$ hydrocarbon group are as described above for $R^1$. Alternatively, the $R^3$ group is a C1 to C4 alkyl group. Alternatively, the $R^3$ group is a propyl group. Typically, on average n' is from of 0.8 to 1.2. Alternatively, on average n' is from 0.9 to 1.1. The number average molecular weight (Mn) of the T based resin is between 1500 and 10,000, alternatively between 1500 and 5,000.

Silsesquioxane or T based resins are well known in the art and are typically prepared by hydrolyzing an organosilane having three hydrolyzable groups on the silicon atom, such as a halogen or alkoxy group. Thus, the T based resins useful as processing aids in the present process can be obtained for example if the organo group is propyl by hydrolyzing propyltrimethoxysilane, propyltriethoxysilane, propyltripropoxysilane, or by co-hydrolyzing the aforementioned propylalkoxysilanes with various alkoxysilanes. Examples of these alkoxysilanes include methyltrimethoxysilane, methyltriethoxysilane, methyltriisopropoxysilane, dimethyldimethoxysilane, and phenyltrimethoxysilane. Propyltrichlorosilane can also be hydrolyzed alone, or in the presence of alcohol. In this case, co-hydrolyzation can be carried out by adding methyltrichlorosilane, dimethyldichlorosilane, phenyltrichlorosilane, or similar chlorosilanes and methyltrimethoxysilane, methyltriethoxysilane, methyltriisopropoxysilane, or similar methylalkoxysilane. Alcohols suitable for these purposes include methanol, ethanol, n-propyl alcohol, isopropyl alcohol, butanol, methoxy ethanol, ethoxy ethanol, or similar alcohols. Examples of hydrocarbon-type solvents which can also be concurrently used include toluene, xylene, or similar aromatic hydrocarbons; hexane, heptane, isooctane, or similar linear or partially branched saturated hydrocarbons; and cyclohexane, or similar aliphatic hydrocarbons.

The solid solventless MQ resins produced by the present process have a higher bulk density then solid solventless MQ resins produced by spray drying. As used herein the term "bulk density" means the weight of solid in grams required to fill at least 30 cm$^3$ of a 50 cm$^3$ volumetric cylinder without using any packing force nor allowing time to settle (but making sure the cylinder is filled uniformly by tapping the cylinder on the lab bench) and dividing the weight by the occupied volume and reporting the value in the units of g/cm$^3$. Generally, the bulk density of solid solventless MQ resins produced by spray drying is less than 0.35 g/cm$^3$. Typically, the bulk density of the solid solventless MQ resins produced by the present process is greater than 0.35 g/cm$^3$. Alternatively, the bulk density of the solid solventless MQ resins produced by the present process is 0.4 to 0.9 g/cm$^3$. Alternatively, the bulk density of the solid solventless MQ resins produced by the present process is 0.5 to 0.9 g/cm$^3$. Alternatively, the bulk density of the solid solventless MQ resins produced by the present process is 0.55 to 0.75 g/cm$^3$.

The present process may be run continuously or with batches. An important aspect of the present process is the use of an extrusion device. These devices are important because they are capable of heating a material, removing volatiles under reduced pressures and moving highly viscous molten materials and solid materials through the process steps. Typically a twin-screw extruder is used. Examples of useful extrusion devices include single screw or twin screw extruders or injection molding devices. The torque needed for the extrusion device to process the MQ resin varies depending on factors such as the average n of the MQ resins used, the processing temperature, the feed rate and the extent of the solvent removal during the process.

Generally, at least one MQ resin dispersed in a volatile solvent is fed into the extruder and heated to a temperature in the range of 50 to 250° C., alternatively 150 to 225° C. The solvent is removed during the process. Typically, vacuum is applied on the extruder to facilitate removal of the solvent and any other volatile components that may be in the MQ resin. Vacuum may be applied in a single or multiple stages of the extruder. It has been found that the use of multiple vacuum stages provides improved removal to the solvent. Typically, vacuum is applied in the range of 200 to 700 mmHg, alternatively 400 to 600 mmHg. If desired, rather than feeding the MQ resin directly into the extrusion device, the ingredients for making the MQ resin could be fed into the extrusion device. In this case water and alcohol generated in the making of the MQ resin and the volatile solvent would need to be removed in addition to a carrier solvent. Additionally, a T (silsesquioxane) resin processing aid could be prepared in-situ in the processing device prior to addition of the MQ resin.

The solventless MQ resin may be recovered by simply permitting the densified mass to cool to ambient temperature upon exiting the extrusion device and then breaking it into the desired form such as chunks, flakes or pellets. Cooling may be augmented by passing the extruded densified stream through a water bath or spray. Alternatively, the densified mass can be shaped into various forms by using practices similar to those in the well-known arts of injection and compression molding thermoplastic materials. A mold, having cavities, for example in a pellet shape, could be used to form the solventless MQ resin in the desired form. Alternatively, as the densified mass cools, it may crumble on its own accord or be ground to a specific size range. Further, the solventless MQ resin may also be a crumbly mass which can be recovered upon exiting the extrusion device. After the solventless MQ resin in recovered, it may be desirable to disperse the recovered, solventless MQ resin in an appropriate solvent such as isododecane or silicone cyclic materials.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in weight percent based on resin solids.

Materials:

Resins A, B and D are MQ resins prepared by a modified silica hydrosol capping process of Daudt, et al., U.S. Pat. No. 2,676,182. Briefly stated, the modified process of Daudt et al. comprises limiting the concentration of the sodium silicate solution, and/or the silicon-to-sodium ratio in the sodium silicate, and/or the time before capping the neutralized sodium silicate solution to generally lower values than those disclosed by Daudt et al. in order to prevent excessive growth of the silica particles and to obtain a soluble organopolysiloxane having the required M:Q ratio. The neutralized silica hydrosol is preferably stabilized with an alcohol, such as isopropanol, and capped with $(CH_3)_3SiO_{1/2}(M)$ siloxane units as soon as possible, preferably within 30 seconds, after being neutralized. The resulting Resin A, was a 70% solids in xylenes solution of $M_{0.95}Q$ resin where n=1.46, Mn=2350, Mw=225, and OH content was 2.5 wt % based on solids. The resulting Resin B was a 60% solids in xylenes of $M_{0.8}Q$ where n is 1.33, Mn=4700, Mw=18,300, and OH content was 3.2 wt % based on solids. The resulting Resin D was a 36% solids solution in hexamethyldisiloxane of $M_{0.8}Q$ where n is 1.33, Mn=4500, and OH content was 3.1 wt % based on solids.

Resin C is a propyl silsesquioxane resin ($T^{Pr}$ resin or $PrSiO_{3/2}$ where Pr means propyl) which was prepared by the hydrolysis of propyl trichlorosilane in toluene. The resulting $T^{Pr}$ resin was a 60% solids in toluene solution of $T^{Pr}$ resin where n'=1, Mn=3150, Mw=9700, and OH content was 6 wt % based on resin solids.

Tests:

Bulk Density was measured by determining the weight of solid resin in grams required to fill at least 30 cm$^3$ of a 50 cm$^3$ volumetric cylinder without using any packing force nor allowing time to settle (but making sure the cylinder is filled uniformly by tapping the cylinder on the lab bench)and dividing the weight by the occupied volume and reporting the value in the units of $g/cm^3$.

Conventional GPC—Resin Analysis/Relative Calibration (MQ Standards):

The samples were prepared in $CHCl_3$ at 0.5% concentration, filtered and analyzed against fractionated MQ resin standards using IR (9.1) detection. Chromatographic equipment consisted of a Waters 2695 Separations Module equipped with a vacuum degasser, a Waters 410 differential refractometer and two (300 mm×7.5 mm) Polymer Laboratories Mixed D's columns (linear separation range of 200 to 400,000).

The separation was performed using HPLC grade Chloroform programmed to run at 1.0 mL/min., injection volume was 50 uL and both columns and detector were thermally controlled at 35 C. Data collection was 25 minutes and processed using Atlas/Cirrus software.

Gas Chromatograph Evaluation

Approximately 0.5 grams of sample was treated with a known quantity of undecane as an internal standard. The sample was then extracted in acetone over night at room temperature. The extract was analyzed on a gas chromatograph equipped with flame ionization detection. Non-volatile and high molecular weight species cannot be detected by gas chromatography. Xylenes were identified by retention time matching to reference materials. Theoretical response factors relative to undecane were used to quantify the xylenes. Other GC-elutable components were present in the GC-FID chromatogram but were not identified nor quantified.

Oven 50° C.(1)-300° C.(10)@15° C./minute-305° C.(5)@15° C./min
Inlet—250° C. 50:1 split
Detector—FID, 275° C., Range=0
Column—DB-1 30m×0.25 mm×0.1 micron film
1.5 ml/min flow, velocity=34, carrier was helium
Injection volume=1 microliter Examples 1-4

Resin A was fed into a twin screw extruder (30 mm intermeshing co-rotating model CX30 from Century Extruders of Traverse City, Mich.) at 60 g/min. with a screw speed of 300 rpm and a single vacuum port operated at 584 to 635 mm Hg vacuum with a collection condenser and receptacle. The barrel temperature was the primary variable investigated and it was varied from 150 to 205° C. The xylenes solvent was removed in the vacuum port and a 2 cm diameter molten resin rod extrudate was recovered. As the resin rod cooled to room temperature it readily crumbled under strain into a solid flake/dense powder material with a bulk density of approximately $0.7 \ g/cm^3$. Analysis of residual xylenes content via gas chromatography following dissolving the resin flake in isopropanol revealed xylenes content and GPC analysis revealed the molecular weight and polydispersity (PD where PD=Mw/Mn) of the extrudate and the results are displayed in Table 1.

TABLE 1

| Example | Si Resin | Temp ° C. | Extruder RPM | Vacuum (port 2) | Residual Xylenes Wt % | Molecular weight Mn, PD |
|---|---|---|---|---|---|---|
| Starting Material Resin A | $M_{.95}Q$ (n = 1.46) | | | | 30 | 2350, 1.79 |
| 1 | $M_{.95}Q$ (n = 1.46) | 150 | 300 | 635 mmHg | 0.30 | 2425, 1.96 |
| 2 | $M_{.95}Q$ (n = 1.46) | 175 | 300 | 635 mmHg | 0.12 | 2400, 1.82 |
| 3 | $M_{.95}Q$ (n = 1.46) | 205 | 300 | 584 mmHg | 0.05 | 2450, 1.85 |
| 4 | $M_{.95}Q$ (n = 1.46) | 205 | 400 | 584 mmHg | 0.04 | Not tested |

Example 5

Solid resin flake was prepared by the procedure used in examples 1 to 4 except that an ice chilled drum was used to rapidly cool and flake the molten resin. The residual xylenes content was 0.25 wt % and the bulk density of the flakes were 0.7 g/cm3.

Examples 6 to 11

Resin B was blended with Resin A at various loadings and devolatilized in the extruder (30 mm intermeshing co-rotating model CX30 from Century Extruders of Traverse City Mich.) to determine how high of molecular weight MQ resin could be prepared into a viable dense flake/powder via this method. Table 2 shows the processing conditions for each run.

TABLE 2

| Example | Si Resin Composition Wt % A/B Resins A = $M_{.95}Q$ B = $M_{.80}Q$ | Temp ° C. | Extruder Feed Rate (g/min) | Torque (% of extruder capacity) | Residual Xylenes Wt % GC | Appearance | Molecular weight Mn, PD |
|---|---|---|---|---|---|---|---|
| 6 | n = 1.33 0/100% | 175 | 80 | 21.7 | Non detectable <0.01 | Crumbly opaque extrudate | 4850, 3.98 |

TABLE 2-continued

| Example | Si Resin Composition Wt % A/B Resins A = $M_{.95}Q$ B = $M_{.80}Q$ | Temp °C. | Extruder Feed Rate (g/min) | Torque (% of extruder capacity) | Residual Xylenes Wt % GC | Appearance | Molecular weight Mn, PD |
|---|---|---|---|---|---|---|---|
| 7 | n = 1.42 71%/29% | 175 | 140 | 5.7 | 0.50 | Clear molten extrudate | 2750, 3.28 |
| 8 | n = 1.40 56%/44% | 175 | 140 | 7.0 | 0.54 | Clear molten extrudate | 3050, 3.63 |
| 9 | n = 1.38 42%/58% | 175 | 140 | 12.9 | 0.49 | Clear molten extrudate | 3250, 3.67 |
| 10 | n = 1.37 36%/64% | 175 | 140 | 17.0 | 0.38 | Clear molten extrudate | 3350, 3.92 |
| 11 | n = 1.34 25%/75% | 175 | 146 | 22.0 | 0.29 | Crumbly extrudate | 3850, 4.01 |

The MQ resin and MQ resin blends readily processed into high density materials by use of the twin screw extruder The materials in Examples 6 and 11 had very high resin B content (low M:Q ratio) and resulted in extrudates that crumbled on exiting the extruder, however they still had high bulk density (density=0.58 g/cm³ for ex 6 material and 0.71g/cm³ for ex 11 material).

Examples 12 to 14

Resin C was blended with Resin B at various loadings and devolatilized in the extruder to determine if $T^{Pr}$ resin could be used to facilitate processing of high molecular weight MQ resin into a high density flake/powder via this method. Table 3 shows the processing conditions for each run and the resulting appearance and volatile content of the extrudate. The $T^{Pr}$ resin was found to be a very efficient processing aid for the high Mw MQ resin providing clear extrudates that are easy to flake into a relatively dense solid form. The $T^{Pr}$ resin is a tacky solid when solventless at room temperature so it is not viable for extruding into a flake on its own using this process.

TABLE 3

| Example | Si Resin Composition Wt % B/C B = $M_{0.8}Q$ C = $T^{Propyl}$ | Temp °C. | Extruder Feed Rate (g/min) | Torque (% of extruder capacity) | Residual Xylenes/ Toluene Wt % | Appearance |
|---|---|---|---|---|---|---|
| 12 | 50%/50% n = 1.15* | 175 | 100 | 5.9 | 0.19/0.03 | Clear molten extrudate |
| 13 | 60%/40% n = 1.18* | 175 | 100 | 8.1 | 0.17/0.02 | Clear molten extrudate |
| 14 | 71%/29% n = 1.22* | 175 | 140 | 11.0 | 0.13/0.01 | Clear molten extrudate |

*weighted average of n and n'

Addition of resin C to the high molecular weight Resin B provided a useful processing aid for enabling a transparent, molten extrudate without introducing linear silicone fluids which can cause migration issues in downstream formulating of release coatings, plastics additives or processing aids. The material produced in example 14 had a measured bulk density of 0.68 g/cm³.

Comparative Example 1

Resin D was fed to a Type HT. Niro Mobile Minor Spray-Dryer (under inert conditions) available from Niro Atomizer, Inc. Columbia Md. Spray-drying was carried out under inert conditions, utilizing nitrogen gas for atomization as well as blanketing the drying chamber. Resin solution D was fed at the rate of 22.7 kg/hr, the nitrogen flow rate at the atomizer nozzle was 0.013 m³/min at a pressure of 41-48 kPa. The nitrogen flow rate into the drying chamber was about 1.98 m³/min at a temperature of 220° C. The exit temperature of the nitrogen from the drying chamber was about 105-112° C. The resulting material was a very fine, low density, white powder. The bulk density of the fine powder was 0.17 g/cm³. The low bulk density of the spray dried MQ powder makes it more difficult to transport and formulate relative to the dense flakes and powders of the invention.

The invention claimed is:

1. A process for producing a solid solventless MQ resin comprising the steps of (1)(A) feeding at least one MQ resin dispersed in a volatile solvent into an extrusion device, where each MQ resin has the general formula (I) $R^1{}_n(R^2O)_b SiO_{(4-n-b/2)}$ where each $R^1$ is monovalent and independently selected from hydrogen, alkyl, alkenyl, oximo, aryl, carbinol, anhydride, epoxy, carboxyl, ether, polyether, amide, and alkyl amino groups, which $R^1$ groups may be the same or different, with the proviso that at least sixty mole percent of $R^1$ groups are methyl, $R^2$ is hydrogen or a monovalent C1 to C4 alkyl group, on average n is from 1.1 to 1.6, and b is such that group ($R^2O$) is 1 to 10 weight percent of the MQ resin, said MQ resins having a number average molecular weight (Mn) between 1,500 and 7,000;

(2) removing the volatile solvent to form a solid solventless MQ resin; and (3) recovering the solid solventless MQ resin, provided steps (1) to (3) are completed without the addition of a linear silicone fluid having a general formula (II): $(R'_3SiO_{1/2})_x(R'_2SiO_{2/2})_y(R'SiO_{3/2})_z$ where x and y are positive numerical values and z is 0 or a positive numerical value with the provisos that x+y+z=1, y/(x+y+z)>0.8 and R' is a functional or nonfunctional, substituted or unsubstituted organic radical, and the DP is greater than 10.

2. The process of claim 1 where on average n is from 1.1 to 1.5.

3. The process of claim 2 where the solid solventless MQ resin recovered from step (3) has a bulk density of 0.4 to 0.9 g/cm$^3$.

4. The process of claim 3 further comprising (1)(B) co-feeding into the extrusion device 5 to 30 weight percent based on total resin solids content of at least one T based resin with the general formula $R^3{}_n(R^2O)_{b'}SiO_{(4-n'-b''/2)}$ where $R^3$ is a C1 to C8 hydrocarbon group, on average n' is from 0.8 to 1.2, and b' is such that group ($R^2O$) is 1 to 20 weight percent of the T based resin, said T based resin having a Mn between 1500 and 10,000.

5. The process of claim 1 where on average n is from 1.3 to 1.5.

6. The process of claim 5 where the solid solventless MQ resin recovered from step (3) has a bulk density of 0.55 to 0.75 g/cm$^3$.

7. The process of claim 1 where the extrusion device is a single screw extruder, a twin screw extruder, or an injection molding devices.

8. The process of claim 1 where such process is a continuous process or a batch process.

9. A process for producing a solid solventless MQ resin comprising the steps of (1)(A) feeding at least one MO resin dispersed in a volatile solvent into an extrusion device, where each MQ resin has the general formula (I) $R^1{}_n(R^2O)_bSiO_{(4-n-b/2)}$ where each $R^1$ is monovalent and independently selected from hydrogen, alkyl, alkenyl, oximo, aryl, carbinol, anhydride, epoxy, carboxyl, ether, polyether, amide, and alkyl amino groups, which $R^1$ groups may be the same or different, with the proviso that at least sixty mole percent of $R^1$ groups are methyl, $R^2$ is hydrogen or a monovalent C1 to C4 alkyl group, on average n is from 1.1 to 1.6, and b is such that group ($R^2O$) is 1 to 10 weight percent of the MQ resin, said MQ resins having a number average molecular weight (Mn) between 1,500 and 7,000, (1)(B) co-feeding into the extrusion device 0.1 to 50 weight percent based on total resin solids content of at least one T based resin with the general formula $R^3{}_n(R^2O)_{b'}SiO_{(4-n'-b''/2)}$ where $R^3$ is a C1 to C8 hydrocarbon group, on average n' is from 0.8 to 1.2, and b' is such that group ($R^2O$) is 1 to 20 weight percent of the T based resin, said T based resin having a Mn between 1500 and 10,000;

(2) removing the volatile solvent to form a solid solventless MQ resin; and (3) recovering the solid solventless MQ resin, provided steps (1) to (3) are completed without the addition of a linear silicone fluid.

10. The process of claim 9 where $R^3$ is a propyl group.

11. The process of claim 10 where on average n' is from 0.9 to 1.1.

12. The process of claim 9 where on average n is from 1.1 to 1.5.

13. The process of claim 12 where the solid solventless MQ resin recovered from step (3) has a bulk density of 0.4 to 0.9 g/cm$^3$.

14. The process of claim 13 wherein (1)(B) comprises co-feeding into the extrusion device 5 to 30 weight percent based on total resin solids content of at least one T based resin with the general formula $R^3{}_n(R^2O)_{b'}SiO_{(4-n'-b'/2)}$.

15. The process of claim 9 where on average n is from 1.3 to 1.5.

16. The process of claim 15 where the solid solventless MQ resin recovered from step (3) has a bulk density of 0.55 to 0.75 g/cm$^3$.

17. The process of claim 16 wherein (1)(B) comprises co-feeding into the extrusion device 5 to 15 weight percent based on total resin solids content of at least one T based resin with the general formula $R^3{}_n(R^2O)_{b'}SiO_{(4-n'-b'/2)}$.

18. The process of claim 9 where the solid solventless MQ resin recovered from step (3) has a bulk density greater than 0.35 g/cm$^3$.

19. The process of claim 9, where the linear silicone fluid has a general formula (II): $(R'_3SiO_{1/2})_x(R'_2SiO_{2/2})_y(R'SiO_{3/2})_z$ where x and y are positive numerical values and z is 0 or a positive numerical value with the provisos that x+y+z=1, y/(x+y+z) >0.8 and R' is a functional or nonfunctional, substituted or unsubstituted organic radical, and the DP is greater than 10.

* * * * *